United States Patent
Takeo

(10) Patent No.: US 10,659,623 B2
(45) Date of Patent: May 19, 2020

(54) IMAGE FORMING APPARATUS, INFORMATION PROCESSING METHOD, AND PROGRAM TO CANCEL A JOB

(71) Applicant: CANON KABUSHIKI KAISHA, Tokyo (JP)

(72) Inventor: Akinori Takeo, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/970,705

(22) Filed: May 3, 2018

(65) Prior Publication Data

US 2018/0255186 A1 Sep. 6, 2018

Related U.S. Application Data

(63) Continuation of application No. PCT/JP2016/081982, filed on Oct. 28, 2016.

(30) Foreign Application Priority Data

Nov. 9, 2015 (JP) ................................ 2015-219687

(51) Int. Cl.
*H04N 1/00* (2006.01)
*G03G 15/00* (2006.01)
*G06F 3/12* (2006.01)

(52) U.S. Cl.
CPC ..... *H04N 1/00018* (2013.01); *G03G 15/5012* (2013.01); *G03G 15/5083* (2013.01); *G03G 15/55* (2013.01); *G03G 15/70* (2013.01); *G06F 3/121* (2013.01); *G06F 3/1207* (2013.01); *G06F 3/1234* (2013.01); *G06F 3/1273* (2013.01); *G06F 3/1274* (2013.01); *H04N 1/00* (2013.01); *H04N 1/00928* (2013.01); *H04N 2201/3202* (2013.01)

(58) Field of Classification Search
None
See application file for complete search history.

(56) References Cited

U.S. PATENT DOCUMENTS

| 6,473,192 | B1 * | 10/2002 | Kidani | .................... | G06F 3/121 |
| | | | | | 358/1.14 |
| 2008/0246993 | A1 * | 10/2008 | Murakami | ............ | G06F 3/1207 |
| | | | | | 358/1.15 |
| 2012/0050783 | A1 * | 3/2012 | Osuki | .................... | G06F 3/1204 |
| | | | | | 358/1.14 |

FOREIGN PATENT DOCUMENTS

| JP | 8-183228 | A | 7/1996 |
| JP | 11-341212 | A | 12/1999 |
| JP | 2001159964 | A | 6/2001 |
| JP | 4584731 | B2 | 11/2010 |
| JP | 2013146898 | A | 8/2013 |
| JP | 201494574 | A | 5/2014 |
| JP | 201539844 | A | 3/2015 |

\* cited by examiner

*Primary Examiner* — Andrew H Lam
(74) *Attorney, Agent, or Firm* — Canon U.S.A., Inc. IP Division

(57) ABSTRACT

To address problems, an image forming apparatus includes a detection unit configured to detect an error, a canceling unit configured to cancel a job in a case where the error is not released when a set period of time has elapsed after the error is detected, and a storage unit configured to store a job history including a cancellation factor indicating that the job is canceled since the set period of time has elapsed after the error is detected.

17 Claims, 6 Drawing Sheets

FIG. 3

| JOB LIST | | |
|---|---|---|
| JOB NAME | RECEPTION NUMBER | STATUS |
| PRINT JOB 1 | 0001 | PRINTING |
| PRINT JOB 2 | 0002 | WAITING |
| PRINT JOB 3 | 0003 | WAITING |
| PRINT JOB 4 | 0004 | WAITING |

| JOB NAME | RECEPTION NUMBER | EXECUTION DATE AND TIME | EXECUTION RESULT |
|---|---|---|---|
| PRINT JOB 1 | 0001 | MAY 1, 2015, 9:00 | OK |
| PRINT JOB 2 | 0002 | MAY 1, 2015, 9:01 | #853 |
| PRINT JOB 3 | 0003 | MAY 1, 2015, 9:04 | #934 |
| PRINT JOB 4 | 0004 | MAY 1, 2015, 9:05 | #935 |

JOB HISTORY

CANCEL | OK

IMAGE FORMING APPARATUS, INFORMATION PROCESSING METHOD, AND PROGRAM TO CANCEL A JOB

CROSS-REFERENCE TO RELATED APPLICATIONS

This application is a Continuation of International Patent Application No. PCT/JP2016/081982, filed Oct. 28, 2016, which claims the benefit of Japanese Patent Application No. 2015-219687, filed Nov. 9, 2015, both of which are hereby incorporated by reference herein in their entirety.

TECHNICAL FIELD

The present invention relates to an image forming apparatus, an information processing method, and a program.

BACKGROUND ART

In general, a plurality of users perform printing operations by inputting print jobs using printer drivers or the like from host computers of the users in office environments. In this operation, to address a case where a printing process is stopped due to an error, such as a jam, a method for restarting a print job after a user manually releases the error without turning off a power source of an image forming apparatus or a method for automatically canceling a print job by the image forming apparatus at a time of occurrence of the error is employed (refer to PTL 1).

Furthermore, when an image forming apparatus automatically cancels a print job due to occurrence of an error as described above, information indicating that the job has been canceled due to some sort of factor is recorded in a job history to be displayed on a screen of the image forming apparatus.

CITATION LIST

Patent Literature

PTL 1 Japanese Patent No. 4584731

However, in the foregoing technique, a user does not recognize whether the job has been automatically canceled as described above or the job has been canceled by another factor.

The present invention notifies a user of whether a job has been automatically canceled or a job has been canceled due to another factor.

SUMMARY OF INVENTION

The present invention provides an image forming apparatus including a detection unit configured to detect an error, a canceling unit configured to cancel a job in a case where the error is not released when a set period of time has elapsed after the error is detected, and a storage unit configured to store a job history including a cancellation factor indicating that the job is canceled since the set period of time has elapsed after the error is detected.

Further features of the present invention will become apparent from the following description of exemplary embodiments with reference to the attached drawings.

BRIEF DESCRIPTION OF DRAWINGS

FIG. 3 is a diagram illustrating a screen for displaying of a job list.

FIG. 9 is a diagram illustrating a screen for displaying a job history.

DESCRIPTION OF EMBODIMENTS

Hereinafter, embodiments of the present invention will be described with reference to the accompanying drawings.

First Embodiment

Hardware Configuration

Figure 1:
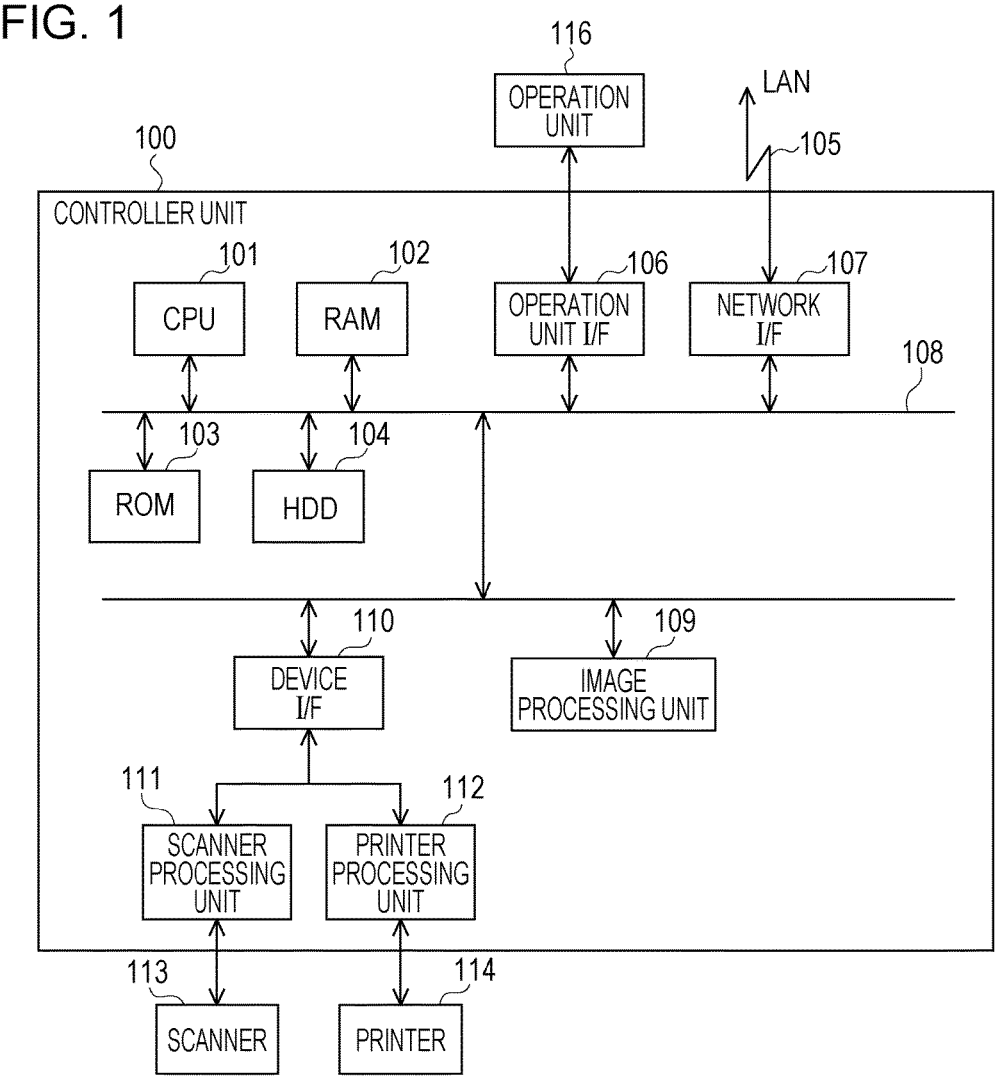
FIG. 1 is a diagram illustrating an example of a hardware configuration and the like of an image forming apparatus.

FIG. 1 is a diagram illustrating an example of a hardware configuration and the like of an image forming apparatus. The image forming apparatus includes, as a hardware configuration, a controller unit 100 which controls the entire image forming apparatus, a scanner 113 which is an image input device, a printer 114 which is an image output device, and an operation unit 116 which displays information on an instruction issued by an operator for an input standby operator. The scanner 113 is connected to a scanner processing unit 111. The printer 114 is connected to a printer processing unit 112. The scanner processing unit 111, the printer processing unit 112, and the operation unit 116 are individually connected to the controller unit 100 and controlled by instructions issued by the controller unit 100.

The controller unit 100 includes a central processing unit (CPU) 101. The CPU 101 is connected to a random access memory (RAM) 102, a read only memory (ROM) 103, a hard disk drive (HDD) 104, an operation unit interface (I/F) 106, and a network I/F 107. The RAM 102 serves as a work area of the CPU 101. The RAM 102 is used as a setting value storage memory for temporarily storing parameter settings and an image memory for storing a portion of image data. The ROM 103 is a boot ROM which stores a system boot program. The HDD 104 stores programs of system software, parameter setting value history, image data, and the like.

A software configuration illustrated in FIG. 2 and processes in flowcharts of FIGS. 4, 6, and 8 described below are realized when the CPU 101 reads programs stored in the ROM 103 and the HDD 104 into the RAM 102 and executes the processes based on the programs.

The operation unit I/F 106 is used for input from and output to the operation unit 116. The operation unit I/F 106 outputs image data to be displayed in response to an instruction issued by the CPU 101 to the operation unit 116 and transmits information input through the operation unit 116 to the CPU 101.

The network I/F 107 is connected to a local area network (LAN) 105 and performs input and output of information relative to the LAN 105. An image processing unit 109 develops a page-description language (PDL) record supplied from the LAN 105 as a bitmap image.

The image processing unit 109 performs image processing on data on an image stored in the HDD 104 in a compressed and encoded manner in a format usable by the printer processing unit 112 before the image is processed by the printer processing unit 112 and output by the printer 114. A device I/F 110 is connected to the scanner 113 and the printer 114 through the scanner processing unit 111 and the printer processing unit 112, respectively, and performs conversion between synchronous/asynchronous of image data and transmission of a setting value, a control value, and data on a device state. The scanner processing unit 111 performs various processes including correction, modification, image-area separation, magnification variation, and binary processing on image data supplied from the scanner 113. The scanner 113 having an automatic continuous original feeding device and a platen reading device is capable of reading both sides of a plurality of originals. Furthermore, the scanner 113 has a sensor which performs detection of opening/closing of an original cover, detection of an original, and detection of a size of an original. The detected information and information on a state of the scanner 113 are transmitted to the CPU 101 through the scanner processing unit 111 and the device I/F 110. The printer processing unit 112 performs processes including correction, resolution conversion, and control of a printing position of an image on image data to be printed out in accordance with the printer 114. The printer 114 includes at least one sheet feeding cassette which stores sheets to be subjected to printing. Information on the numbers of remaining sheets, presence or absence of toners, and the like of individual sheet feeding cassettes is transmitted to the CPU 101 through the printer processing unit 112 and the device I/F 110.

Software Configuration

Figure 2:
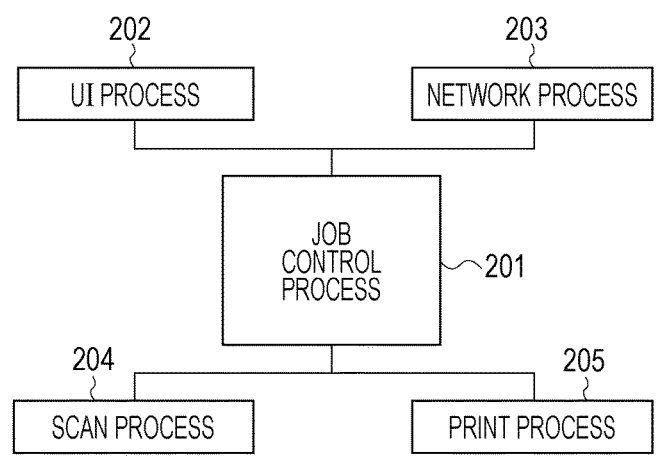
FIG. 2 is a diagram illustrating an example of a software configuration of the image forming apparatus.

FIG. 2 is a diagram illustrating an example of a software configuration of the image forming apparatus.

A job control process 201 integrates and controls various software modules and controls various jobs, such as copy, print, scan, and a UI process, generated in the image forming apparatus.

A UI process 202 mainly performs control associated with the operation unit 116 and the operation unit I/F 106. The UI process 202 transmits content of an operation performed by an operator on the operation unit 116 to the job control process 201 and controls display content on a display screen of the operation unit 116 based on an instruction issued by the job control process 201. Furthermore, the UI process 202 controls editing of rendering data to be displayed in the operation unit 116 and the like.

A network process 203 is a module which mainly controls communication with an external apparatus through the network I/F 107 and controls communication with various apparatuses on the LAN 105. When receiving control commands or data from the various apparatuses on the LAN 105, the network process 203 notifies the job control process 201 of content of the reception. Furthermore, the network process 203 transmits a control command or data to the various apparatuses on the LAN 105 based on an instruction issued by the job control process 201.

A scan process 204 controls the scanner 113 and the scanner processing unit 111 based on an instruction issued by the job control process 201 and instructs reading of an original set in the scanner 113. Then the scan process 204 instructs the scanner processing unit 111 to perform image processing on the read original image. The scan process 204 obtains information on states of the scanner processing unit 111 and the scanner 113 and notifies the job control process 201 of the state information. A print process 205 controls the image processing unit 109, the printer processing unit 112, and the printer 114 based on an instruction issued by the job control process 201 so as to perform a print process relative to a specified image process. The print process 205 receives image data, image information (a size, a color mode, resolution, and the like of the image data), layout information (offset, magnification, imposition, and the like), output sheet information (a size and a printing direction), and the like from the job control process 201. Then the print process 205 performs an appropriate image process on the image data by controlling the image processing unit 109 and the printer processing unit 112 and instructs printing on a printing sheet by controlling the printer processing unit 112 and the printer 114. Thereafter, the print process 205 obtains information on states of the printer processing unit 112 and the printer 114 and notifies the job control process 201 of the state information.

Display of Job List

FIG. 3 is a diagram illustrating a screen for displaying a job list. The CPU 101 reads job information stored in the RAM 102 and causes the operation unit 116 to display the job information in the display screen illustrated in FIG. 3 through the operation unit I/F 106.

Display content of the job list includes a job name, a reception number, and a status. The CPU 101 successively displays jobs in order of execution. A status of Print Job 1 is "printing" which indicates that the job is currently being printed. Statuses of Print Jobs 2 to 4 are "waiting" which indicates that the jobs are currently in a print standby state. Printing of the jobs in the waiting status is successively performed when printing of all preceding jobs in an earlier execution order is completed, and statuses of the jobs are changed during the printing. Furthermore, if a job in the printing status is interrupted due to an error, such as a sheet jam error or a no-sheet error, a status of a succeeding job remains in the waiting status until the job interrupted due to the error is completed.

Figure 4:
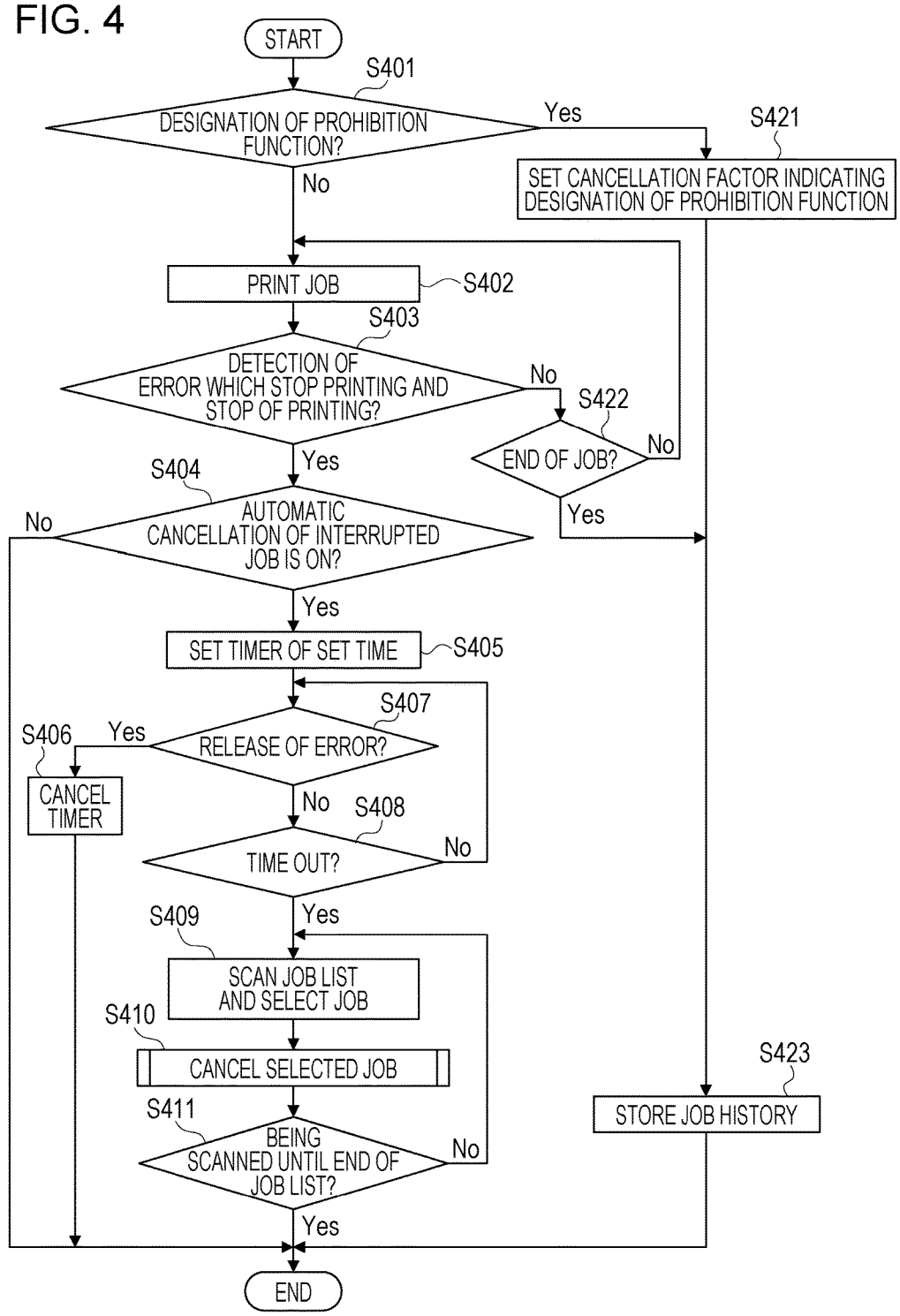
FIG. 4 is a flowchart of an example of information processing.

Flowchart of Automatic Job Cancellation Performed when Predetermined Period of Time has Elapsed after Job Interruption Due to Error FIG. 4 is a flowchart of an example of information processing performed in a case where a job is automatically canceled when a predetermined period of time has elapsed after the job is interrupted due to an error in the image forming apparatus.

In step S401, the job control process 201 receives a job execution instruction issued by the user through the UI process 202. Alternatively, the job control process 201 receives, through the network process 203, print information transmitted from an external computer through the LAN 105 and the network I/F 107. Thereafter, the job control process 201 interprets and receives the job execution instruction based on the information received by the network process 203.

Furthermore, the job control process 201 determines whether the received job execution instruction includes a designation of a prohibition function. When the determination is affirmative (Yes in step S401), the job control process 201 transmits a job termination notification to the print process 205 and the UI process 202 and cancels the job before proceeding to step S421. On the other hand, when the determination is negative (No in step S401), the job control process 201 proceeds to step S402 where printing of the job is started. Here, the prohibition function includes a designation of a function which may not be used, such as a designation of a Box job at a time when a Box function is unavailable and a designation of a combination of functions which may not be designated in combination, such as a designation of a combination of a binding function and a punching function.

In step S421, the job control process 201 reflects a cancellation factor of the canceled job on job information to be stored in the RAM 102. Here, a cancellation factor (#853, for example) corresponding to the prohibition function is set.

In step S423, the job control process 201 stores the job information stored in the RAM 102 in the HDD 104 as a job history of processed jobs. The job history includes a job name, a reception number, an execution date and time, an execution result, and the cancellation factor set in step S421.

In step S402, the job control process 201 causes the print process 205 to start printing of the received job.

In step S403, the job control process 201 receives information on occurrence of an error from the printer 114 through the device I/F 110 and the like. The error information supplied from the printer 114 includes an error factor, such as a no-sheet notification indicating a shortage of sheets in a sheet feeding cassette, a jam notification indicating that a jam has occurred, or a no-toner notification indicating a shortage of toner. When receiving the error information, the job control process 201 requests the print process 205 to stop the process. The error information supplied from the print process 205 is transmitted to the UI process 202 through the job control process 201. The UI process 202 displays a screen corresponding to error information in the operation unit 116. The job control process 201 proceeds to step S422 when an error is not detected (No in step S403) and proceeds to step S404 when an error is detected (Yes in step S403).

In step S422, the job control process 201 determines whether the printing of the job has been terminated. The job control process 201 proceeds to step S423 when the determination is affirmative (Yes in step S422) and returns to step S402 when the determination is negative (No in step S422).

In step S423, the job control process 201 stores the job history. When the printing is terminated without detecting occurrence of an error, "OK" is set as a result of the execution and is stored in the job history.

In step S404, the job control process 201 determines whether a setting of automatic cancellation to be performed on an interrupted job is in an On state. The job control process 201 terminates the process of the flowchart in FIG. 4 when the determination is negative (No in step S404). On the other hand, the job control process 201 proceeds to step S405 so that a timer is set for the automatic cancellation when the determination is affirmative (Yes in step S404). In step S405, the job control process 201 obtains a period of time until the automatic cancellation which corresponds to the error factor received from the printer 114 in step S403. Thereafter, the job control process 201 sets the determined period of time before the automatic cancellation is performed to the timer.

Figure 5:
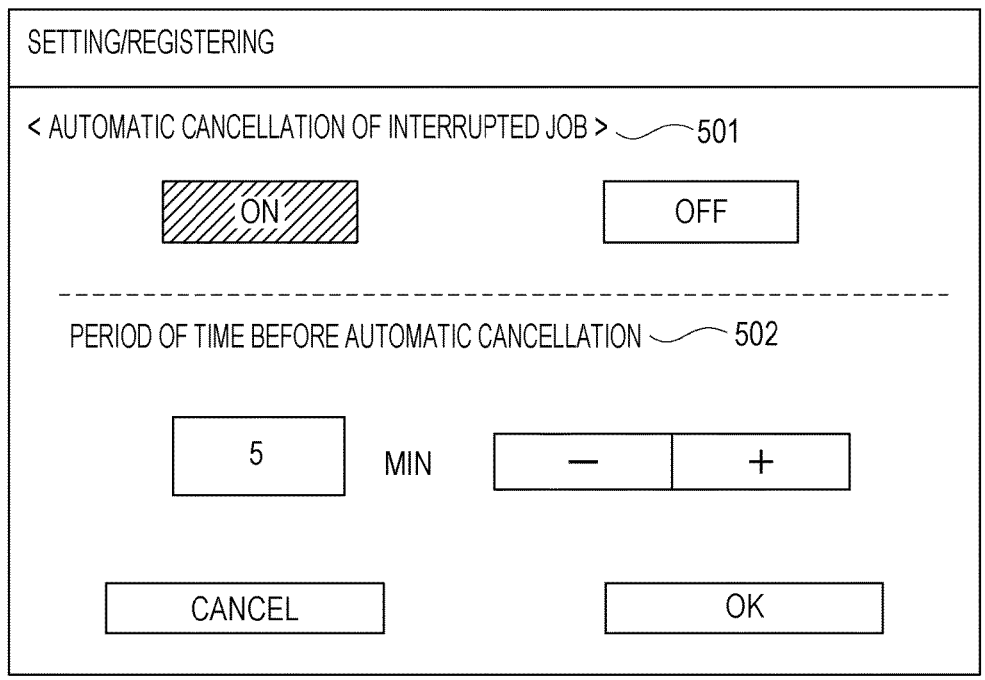
FIG. 5 is a diagram illustrating an example of a setting/registering screen.

FIG. 5 is a diagram illustrating an example of a setting/registering screen for performing an On/Off setting of the automatic job cancellation at a time of job interruption and for setting a period of time before the automatic cancellation is performed which is displayed in the operation unit 116. A switch 501 is used to determine whether job cancellation is to be performed at an arbitrary time point after an error occurs. An item 502 is used to set a period of time before the automatic cancellation is performed. The CPU 101 displays the setting/registering screen illustrated in FIG. 5 for each error factor in accordance with a predetermined user operation and stores a setting value and the like set in FIG. 5 in the HDD 104 or the nonvolatile RAM 102 for each error factor. Note that the CPU 101 may display the screen illustrated in FIG. 5 in the operation unit 116 as a setting/registering screen for all error factors irrespective of an error factor. In this case, the setting value and the like set in FIG. 5 are applied to all the error factors. In FIG. 5, the case where the On/Off setting of the automatic job cancellation at the time of job interruption and the setting of the period of time before the automatic cancellation is performed are performed in one screen is illustrated as an example. However, the CPU 101 may individually display a screen for performing the On/Off setting of the automatic job cancellation at the time of job interruption and a screen for performing the setting of the period of time before the automatic cancellation is performed in the operation unit 116.

In step S407, the job control process 201 determines whether error release has been received from the printer 114 through the device I/F 110 and the like. The job control process 201 proceeds to step S406 when error release has been received (Yes in step S407) and proceeds to step S408 when error release has not been received (No in step S407).

In step S406, the job control process 201 cancels the timer. The job control process 201 notifies the UI process 202 of the error release. Then the UI process 202 cancels an error screen displayed in the operation unit 116. The job control process 201 instructs the print process 205 to restart the printing.

On the other hand, the job control process 201 determines whether the timer has been timed out in step S408. When the determination is affirmative (Yes in step S408), the job control process 201 proceeds to step S409 so that the job automatic cancellation is to be executed. On the other hand, when the determination is negative (No in step S408), the job control process 201 maintains a state of the job interruption and returns to step S407 to receive the error release.

In step S409, the job control process 201 scans a list of jobs which have been received from the top so as to select one of the jobs since the period of time before the automatic cancellation is performed at the time of job interruption is terminated.

In step S410, the job control process 201 executes a process of canceling the job selected in step S409. The cancellation process will be described hereinafter in detail with reference to FIG. 6.

In step S411, the job control process 201 determines whether the job list has been scanned to the end. When the determination is affirmative (Yes in step S411), the job control process 201 terminates the flowchart of FIG. 4. On the other hand, when the determination is negative (No in step S411), the job control process 201 returns to step S409 where a next job is selected and the job cancellation is executed.

Flowchart of Job Canceling Process

Figure 6:
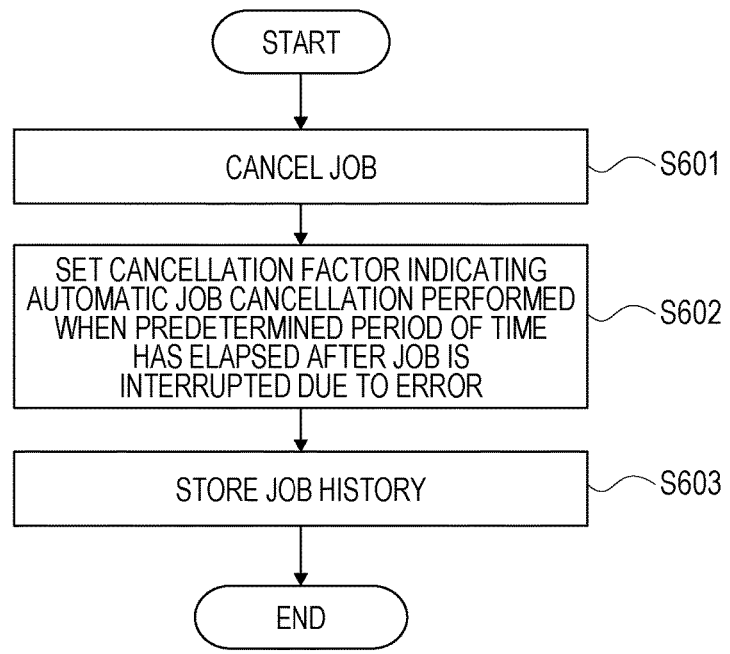
FIG. 6 is a flowchart of an example of a job canceling process.

FIG. 6 is a flowchart of an example of the job canceling process performed in step S410 of FIG. 4.

In step S601, the job control process 201 transmits a job termination notification to the print process 205 and the UI process 202 and cancels the job.

In step S602, the job control process 201 reflects a cancellation factor of the canceled job on job information to be stored in the RAM 102. Here, the job control process 201 sets #934 indicating the automatic job cancellation performed when a predetermined period of time has elapsed after the job is interrupted due to an error as the cancellation factor which is distinguished from other job cancellation factors.

In step S603, the job control process 201 stores the job information stored in the RAM 102 in the HDD 104 as a job history of canceled jobs. The job history includes a job name, a reception number, an execution date and time, an execution result, and the factor at a time of termination due to cancellation set in step S602.

Display of Job History

Figures 7, 8:
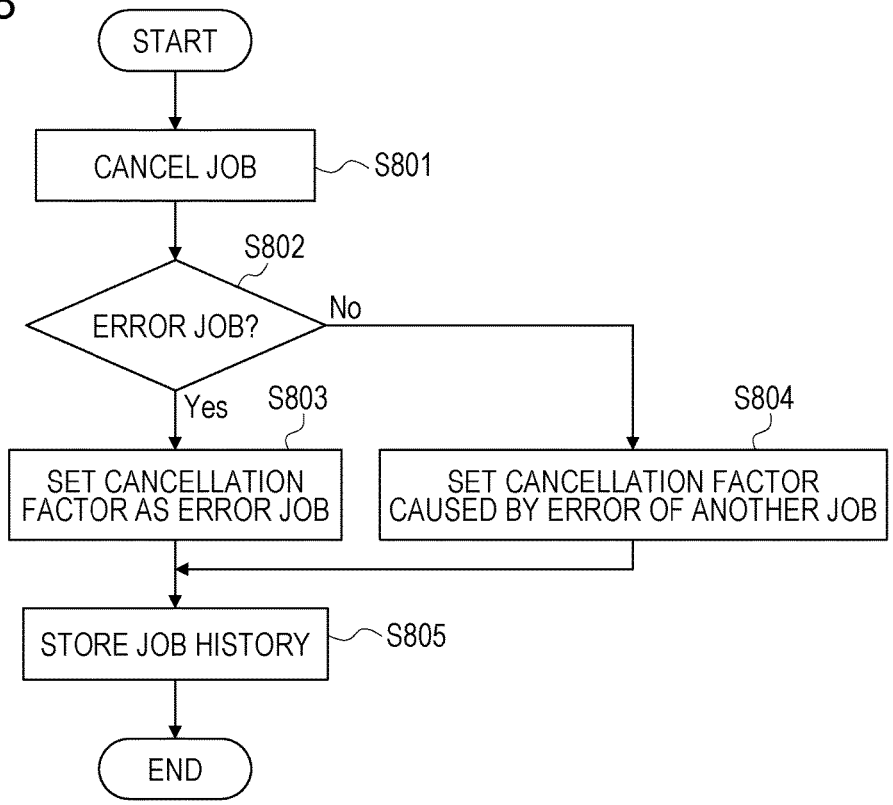
FIG. 7 is a diagram illustrating a screen for displaying a job history.
FIG. 8 is a flowchart of an example of a job canceling process.

FIG. 7 is a diagram illustrating a screen for displaying the job history. The CPU 101 reads the job information stored in the HDD 104 into the RAM 102 and causes the operation unit 116 to display the job information through the operation unit I/F 106.

Although content of the display of the job history includes a job name, a reception number, an execution date and time, and an execution result as illustrated in FIG. 7, the content of the display may include other information associated with jobs, such as a job owner and the number of outputs. An execution result of Print Job 1 is "OK" which indicates that the job has been appropriately terminated. Execution results of Pint Jobs 3 and 4 is "#934" which indicates that each of the jobs is canceled by the automatic job cancellation when a predetermined period of time has elapsed after the job is interrupted due to an error. Print Jobs 3 and 4 are distinguished from other jobs canceled by other factors. Furthermore, an execution result of Print Job 2 is "#853" which indicates that the job has been canceled by other factors.

Second Embodiment

When an error occurs, an interrupted job and a standby job may be simultaneously canceled by the automatic job cancellation performed when a predetermined period of time has elapsed on the job interrupted due to an error. In this case, different operations may be performed on the different jobs, that is, the job interrupted due to an error and the standby job, to obtain individual outputs. For example, a job which is in a standby state when an error occurs in a preceding job due to a shortage of sheets may use sheets different from those of the preceding job which is interrupted due to the error. In this case, if a no-sheet error does not occur, an output may be obtained only by inputting the job again without performing an operation for recovery from the error or preventing the error from occurring. However, in a case where a job which is canceled during interruption due to occurrence of an error and a job which is canceled in a standby state are not distinguished from each other in the job history as illustrated in the first embodiment, a user may not recognize whether a certain job has been canceled in a standby state.

To address this problem, a second embodiment will be described with reference to FIGS. 8 and 9.

Flowchart of Job Canceling Process

FIG. 8 is a flowchart of an example of a job canceling process according to the second embodiment which corresponds to step S410 of FIG. 4.

Processes in step S801 and S805 are the same as those in step S601 and step S603 of FIG. 6, respectively, and therefore, descriptions thereof are omitted.

In step S802, a job control process 201 checks states of jobs and determines whether a cancellation-target job is in an interrupted state due to occurrence of an error or in a standby state. When the job is in the interrupted state due to occurrence of an error (Yes in step S802), the job control process 201 proceeds to step S803, and otherwise (No in step S802) the job control process 201 proceeds to step S804.

In step S803 and step S804, the job control process 201 reflects a cancellation factor of the canceled job on job information to be stored in a RAM 102. In step S803, the job control process 201 sets #934 indicating automatic job cancellation performed when a predetermined period of time has elapsed after the job is interrupted due to an error as the cancellation factor of the canceled job. On the other hand, in step S804, the job control process 201 sets #935 indicating that the job has been canceled in the standby state by the automatic job cancellation performed when a predetermined period of time has elapsed after another job is interrupted due to an error as the cancellation factor of the canceled job.

Display of Job History

FIG. 9 is a diagram illustrating a screen for displaying a job history according to the second embodiment. The screen for displaying the job history has been described with reference to FIG. 7, and therefore, only differences between FIGS. 7 and 9 will now be described.

In FIG. 9, an execution result of Print Job 3 is "#934" which indicates a job in which a factor at a time of termination due to cancellation is stored in the job history in step S803 and a job which is automatically canceled when a predetermined period of time has elapsed after interruption of printing due to occurrence of an error. An execution result of Print Job 4 is "#935" which indicates a job in which a factor at a time of termination due to cancellation is stored in the job history in step S804 and a job which is automatically canceled in a standby state for waiting for termination of a process of Print Job 3 and which is automatically canceled with Print Job 3 in which an error has occurred.

According to the process in the second embodiment, a job which is interrupted due to occurrence of an error which is a direct factor of the automatic job cancellation and a job which is automatically canceled in a standby state for waiting for termination of a process of another job may be displayed in a distinguishable manner in the job history. Accordingly, the user may select appropriate operations for a plurality of jobs which are automatically canceled when a predetermined period of time has elapsed after one of the jobs is interrupted due to an error in accordance with a determination as to whether the job has been canceled due to occurrence of an error or the job in a standby state has been involved in the cancellation.

Other Embodiments

According to the present invention, programs which realize at least one of the functions in the foregoing embodiments are supplied to a system or an apparatus through a network or a storage medium. The present invention may be realized when at least one processor included in a computer of the system or the apparatus reads and executes the programs. Furthermore, the present invention may be realized by a circuit which realizes at least one of the functions (an application specific integrated circuit (ASIC), for example).

Although the preferred embodiments of the present invention have been described in detail hereinabove, the present invention is not limited to the specific embodiments. The controller unit 100 may include a plurality of CPUs, a plurality of ROMs, a plurality of HDDs, a plurality of network I/Fs, or the like, for example.

According to the foregoing embodiments, job cancellation due to occurrence of an error and job cancellation due to other factors may be recorded in a job history to be displayed in a distinguishable manner. Accordingly, a user may recognize that job cancellation has occurred due to occurrence of an error, and therefore, a process in accordance with a cancellation factor may be performed. Accordingly, an operation load of the user may be reduced while an issue associated with security in which highly-confidential prints are viewed by a third party is avoided.

According to the present invention, information indicating whether a job has been automatically canceled or a job has been canceled due to another factor may be provided for a user.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image forming apparatus comprising:
a receiver configured to receive a print job; and
at least one printer controller configured to function as:
a first determination unit configured to determine whether the received print job designates functions conflicting with each other,
a second determination unit configured to determine whether the image forming apparatus has a consumable material to be used for processing the received print job,
a control unit configured to cancel a received print job,
wherein, in a first case where the image forming apparatus is determined not to have the consumable material, the control unit is configured to wait without canceling the received print job until a preset time elapses and to cancel the received print job based on the elapsing of the preset time without having the consumable material refilled, and
wherein, in a second case where the received print job is determined to designate functions conflicting with each other, the control unit is configured to cancel the received print job without waiting until the preset time elapses, and
a display unit configured to display a job history after the received print job is canceled,
wherein a first job history, displayed on the display unit for representing the canceling of the received print job in the first case, and a second job history, displayed on the display unit for representing the canceling of the received print job in the second case, both indicate that the received print job is not successfully processed, but the first job history indicates, and the second job history does not indicate, that the received print job was canceled after the elapsing of the preset time.

2. The image forming apparatus according to claim 1, wherein the at least one printer controller further is configured to function as a determination unit configured to determine whether received print job cancellation is available when an error is detected, and
wherein the control unit cancels the received print job when the determination unit determines that the received print job cancellation is available and the error is not released before the preset time has elapsed after the error is detected.

3. The image forming apparatus according to claim 2, wherein the at least one printer controller further is configured to function as a first setting unit configured to set whether the received print job cancellation is to be available, and
wherein the determination unit is configured to determine whether the received print job cancellation is available based on the setting performed by the first setting unit.

4. The image forming apparatus according to claim 3, wherein the first setting unit is configured to set whether the received print job cancellation is to be available based on a user operation received through a screen.

5. The image forming apparatus according to claim 2, wherein the at least one printer controller further is configured to function as a second setting unit configured to set a period of time before cancellation is performed, and
wherein the control unit cancels a received print job when an error is not released before the period of time set by the second setting unit has elapsed after the error is detected.

6. The image forming apparatus according to claim 5, wherein the second setting unit is configured to set a period of time before the cancellation is performed based on a user operation received through a screen.

7. The image forming apparatus according to claim 2, wherein an error is a status of not being able to continue execution of the received print job.

8. The image forming apparatus according to claim 2, wherein an error occurs based on occurrence of a sheet jam.

9. The image forming apparatus according to claim 2, further comprising a sheet feeding cassette configured to store sheets,
wherein the error occurs based on absence of sheets in the sheet feeding cassette.

10. The image forming apparatus according to claim 2, wherein, based on that the preset time has elapsed with an error remaining not released, the control unit cancels a received print job that is scheduled to be executed next after a received print job for which the error was detected.

11. The image forming apparatus according to claim 1, wherein the at least one printer controller further is configured to function as a determination unit configured to determine a reason for cancellation of the received print job, and
wherein, based on that an error remains not released when the preset time has elapsed since detection of the error, the determination unit determines that the reason for cancellation of the received print job is a first factor of cancelation.

12. The image forming apparatus according to claim 1, wherein the display unit is configured to display, in association with the received print job, a third factor of cancellation, which indicates that the received print job has been canceled based on that the received print job has been canceled due to a first factor of cancellation.

13. The image forming apparatus according to claim 1, further comprising:
an operation unit configured to accept an operation from a user;
a reading unit configured to read a document and generate image data; and
a printing unit configured to print an image that is based on the generated image data on a sheet,
wherein the display unit is configured to accept an operation from the user, and
wherein receiving a received print job execution instruction by the display unit triggers generating image data by the reading unit and performing printing by the printing unit on a sheet based on the generated image data.

14. The image forming apparatus according to claim 1, further comprising:
- a receiving unit configured to receive print information from an external apparatus; and
- a printing unit configured to perform printing on a sheet based on the received print information,
- wherein printing on the sheet by the printing unit is performed based on the receiving unit receiving print information of the received print job.

15. The image forming apparatus according to claim 1, wherein a second factor of cancellation indicates that the received print job has been canceled based on that the canceled received print job is a job using a function that is not available for use among functions of the image forming apparatus.

16. A method for an image forming apparatus, the method comprising:
- receiving a print job;
- determining, as a first determination, whether the received print job designates functions conflicting with each other;
- determining, as a second determination, whether the image forming apparatus has a consumable material to be used for processing the received print job;
- canceling a received print job,
- wherein, in a first case where the image forming apparatus is determined not to have the consumable material, the canceling includes waiting without canceling the received print job until a preset time elapses and canceling the received print job based on the elapsing of the preset time without having the consumable material refilled, and
- wherein, in a second case where the received print job is determined to designate functions conflicting with each other, the canceling includes canceling the received print job without waiting until the preset time elapses; and
- displaying, on a display unit, a job history after the received print job is canceled,
- wherein a first job history, displayed on the display unit for representing the canceling of the received print job in the first case, and a second job history, displayed on the display unit for representing the canceling of the received print job in the second case, both indicate that the received print job is not successfully processed, but the first job history indicates, and the second job history does not indicate, that the received print job was canceled after the elapsing of the preset time.

17. A non-transitory computer-readable storage medium storing a program to cause a computer to perform a method for an image forming apparatus, the method comprising:
- receiving a print job;
- determining, as a first determination, whether the received print job designates functions conflicting with each other;
- determining, as a second determination, whether the image forming apparatus has a consumable material to be used for processing the received print job;
- canceling a received print job,
- wherein, in a first case where the image forming apparatus is determined not to have the consumable material, the canceling includes waiting without canceling the received print job until a preset time elapses and canceling the received print job based on the elapsing of the preset time without having the consumable material refilled, and
- wherein, in a second case where the received print job is determined to designate functions conflicting with each other, the canceling includes canceling the received print job without waiting until the preset time elapses; and
- displaying, on a display unit, a job history after the received print job is canceled,
- wherein a first job history, displayed on the display unit for representing the canceling of the received print job in the first case, and a second job history, displayed on the display unit for representing the canceling of the received print job in the second case, both indicate that the received print job is not successfully processed, but the first job history indicates, and the second job history does not indicate, that the received print job was canceled after the elapsing of the preset time.

* * * * *